US012242562B2

United States Patent
Yalovetzky et al.

(10) Patent No.: US 12,242,562 B2
(45) Date of Patent: Mar. 4, 2025

(54) SYSTEMS AND METHODS FOR ENHANCED EIGENVALUE INVERSION USING QUANTUM CONDITIONAL LOGIC

(71) Applicant: JPMORGAN CHASE BANK, N.A., New York, NY (US)

(72) Inventors: Romina Yalovetzky, Buenos Aires (AR); Dylan Herman, Woodcliff Lake, NJ (US); Pierre Minssen, New York, NY (US); Marco Pistoia, Amawalk, NY (US); Alexander Buts, Vernon Hills, IL (US); Shaohan Hu, Yorktown Heights, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 921 days.

(21) Appl. No.: 17/331,445

(22) Filed: May 26, 2021

(65) Prior Publication Data

US 2022/0382827 A1 Dec. 1, 2022

(51) Int. Cl.
*G06F 17/12* (2006.01)
*G06F 17/16* (2006.01)
*G06N 10/00* (2022.01)

(52) U.S. Cl.
CPC .............. *G06F 17/12* (2013.01); *G06F 17/16* (2013.01); *G06N 10/00* (2019.01)

(58) Field of Classification Search
CPC .......... G06F 17/12; G06F 17/16; G06N 10/00
USPC ........................................................ 703/26
See application file for complete search history.

(56) References Cited

U.S. PATENT DOCUMENTS

| 2019/0378047 A1* | 12/2019 | Pistoia | G06F 17/14 |
| 2020/0042882 A1* | 2/2020 | Liu | G06F 17/18 |
| 2020/0218518 A1* | 7/2020 | Gambetta | G06F 8/41 |

* cited by examiner

*Primary Examiner* — Andre Pierre Louis
(74) *Attorney, Agent, or Firm* — GREENBERG TRAURIG LLP

(57) ABSTRACT

Embodiments use quantum conditional logic in the Quantum Phase Estimation Algorithm (QPEA) to compute eigenvalues prior to inversion. Embodiments estimate the eigenvalues of a unitary, $U=e^{i\hat{A}t}$, generated by a N×N Hermitian matrix $\hat{A}$. The binary representations of the n-bit estimations of eigenvalues of $\hat{A}$ may be encoded in these states:

$|\lambda_i\rangle = |b_1 b_2 \ldots b_n\rangle$; $\lambda_i$ is an estimation of the i-th eigenvalue, excluding degeneracy, and $.b_1 b_2 \ldots b_n$ is its binary representation. To perform the eigenvalue inversion, an n-qubit controlled Ry rotation with angle $\lambda_i/2^{(n-1)}$ conditioned on seeing $|b_1 b_2 \ldots b_n\rangle$ is applied for each possible n-bit binary string $b_1 b_2 \ldots b_n$ ($2^n$ values). The overall unitary is called a "uniformly controlled Ry rotation" in literature.

4 Claims, 3 Drawing Sheets

SYSTEMS AND METHODS FOR ENHANCED EIGENVALUE INVERSION USING QUANTUM CONDITIONAL LOGIC

BACKGROUND OF THE INVENTION

1. Field of the Invention

Embodiments are generally directed to systems and methods for enhanced eigenvalue inversion using quantum conditional logic.

2. Description of the Related Art

Quantum computers are able to calculate an angle for the controlled Ry rotations to perform eigenvalue inversion. Eigenvalue inversion may be used so solve quantum linear systems problems using a quantum algorithm for solving linear equation system problems, commonly known as "HHL." HHL is described in Harrow, et al., "Quantum algorithm for linear systems of equations," Physical review letters 103.15, p. 150502. (2009), the disclosure of which is hereby incorporated, by reference, in its entirety. Noisy Intermediate Scale Quantum (NISQ) devices, however, present limitations on the number and quality of qubits that can be used, and a challenge for running this circuit for the eigenvalue inversion.

SUMMARY OF THE INVENTION

Systems and methods for enhanced eigenvalue inversion using quantum conditional logic are disclosed. In one embodiment, a classical computer may include a computer processor and a memory storing a classical computer program. The classical computer program may be configured to generate a quantum computer program comprising instructions to: initialize a register to an initial state; initialize an ancilla qubit and apply a Hadamard gate to the ancilla qubit; determine a number of iterations n to estimate n-bit eigenvalues; perform a first unitary gate raised to $2^{n-1}$ and controlled by the ancilla qubit; perform a Hadamard gate on the ancilla qubit; measure the ancilla qubit and save in a classical register $C_0$; clear the ancilla qubit; initialize a counter i to n−2; perform a second unitary gate raised to $2^i$ and controlled by the ancilla qubit; perform a phase gate on the ancilla qubit conditioned on a value in a classical register $C_{(n-1)-i-1}$ and apply a Hadamard gate on the ancilla qubit; measure the ancilla qubit and save in a classical register $C_{(n-1)-i}$; clear the ancilla qubit; and decrease i by 1 and repeating the performing of the second unitary gate, the performing of the phase gate, the applying of the Hadamard gate, the measuring of the ancilla qubit, the saving of the ancilla qubit, and the decreasing of i by 1 until i is equal to zero. The classical computer program may send the quantum computer program to a quantum computer, receives results from the quantum computer in the classical registers $C_0$, $C_1$, ... $C_{n-1}$, and output the results.

In one embodiment, the results from the quantum computer in the classical registers $C_0, C_1, \ldots C_{n-1}$ are binaries of the n-bit eigenvalues.

According to another embodiment, a method for n-bit eigenvalue estimation may include: (1) initializing, by a quantum computer program, a register to an initial state; (2) initializing, by a quantum computer program, an ancilla qubit and apply a Hadamard gate to the ancilla qubit; (3) determining, by a quantum computer program, a number of iterations n to estimate n-bit eigenvalues; (4) performing, by a quantum computer program, a first unitary gate raised to $2^{n-1}$ and controlled by the ancilla qubit; (5) performing, by a quantum computer program, a Hadamard gate on the ancilla qubit; (6) measuring, by a quantum computer program, the ancilla qubit and save in a classical register $C_0$; (7) clearing, by a quantum computer program, the ancilla qubit; (8) initializing, by a quantum computer program, a counter i to n−2; (9) performing, by a quantum computer program, a second unitary gate raised to $2^i$ and controlled by the ancilla qubit; (10) performing, by a quantum computer program, a phase gate on the ancilla qubit conditioned on a value in a classical register $C_{(n-1)-i-1}$ and apply a Hadamard gate on the ancilla qubit; (11) measuring the ancilla qubit and save in a classical register $C_{(n-1)-i}$; (12) clearing the ancilla qubit; (13) decreasing i by 1 and repeating the performing of the second unitary gate, the performing of the phase gate, the applying of the Hadamard gate, the measuring of the ancilla qubit, the saving of the ancilla qubit, and the decreasing of i by 1 until i is equal to zero; and (14) outputting the classical registers $C_0, C_1, \ldots C_{n-1}$, wherein the classical registers $C_0, C_1, \ldots C_{n-1}$ comprise the n-bit eigenvalues.

According to another embodiment, a system may include: a classical computer comprising a memory storing a classical computer program, wherein the classical computer program is configured to generate a quantum computer program comprising instructions to: initialize a register to an initial state; initialize an ancilla qubit and apply a Hadamard gate to the ancilla qubit; determine a number of iterations n to estimate n-bit eigenvalues; perform a first unitary gate raised to $2^{n-1}$ and controlled by the ancilla qubit; perform a Hadamard gate on the ancilla qubit; measure the ancilla qubit and save in a classical register $C_0$; clear the ancilla qubit; initialize a counter i to n−2; perform a second unitary gate raised to $2^i$ and controlled by the ancilla qubit; perform a phase gate on the ancilla qubit conditioned on a value in a classical register $C_{(n-1)-i-1}$ and apply a Hadamard gate on the ancilla qubit; measure the ancilla qubit and save in a classical register $C_{(n-1)-i}$; clear the ancilla qubit; and decrease i by 1 and repeating the performing of the second unitary gate, the performing of the phase gate, the applying of the Hadamard gate, the measuring of the ancilla qubit, the saving of the ancilla qubit, and the decreasing of i by 1 until i is equal to zero. The system may include a quantum computer that receives the quantum computer program from the classical computer, executes the quantum computer program, and outputs the classical registers $C_0, C_1, \ldots C_{n-1}$, wherein the classical registers $C_0, C_1, \ldots C_{n-1}$ comprise the n-bit eigenvalues.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Systems and methods for enhanced eigenvalue inversion using quantum conditional logic are disclosed.

Embodiments use quantum conditional logic in the Quantum Phase Estimation Algorithm (QPEA) to compute eigenvalues prior to inversion. Embodiments estimate the eigenvalues of a unitary, $U=e^{iÂt}$, generated by a N×N Hermitian matrix Â. The binary representations of the n-bit estimations of eigenvalues of Â may be encoded in these states: $|\lambda_i\rangle = |b_1 b_2 \ldots b_n\rangle$; $\lambda_i$ is an estimation of the i-th eigenvalue, excluding degeneracy, and $.b_1 b_2 \ldots b_n$ is its binary representation. To perform the eigenvalue inversion, an n-qubit controlled Ry rotation with angle $\lambda_i/2^{(n-1)}$ conditioned on seeing $|b_1 b_2 \ldots b_n\rangle$ is applied for each possible n-bit binary string $b_1 b_2 \ldots b_n$ ($2^n$ values). The overall unitary is called a "uniformly controlled Ry rotation" in literature.

Embodiments use quantum conditional logic in the Quantum Phase Estimation Algorithm (QPEA) to compute eigenvalues prior to inversion. Embodiments estimate the eigenvalues of a unitary, $U=e^{iÂt}$, generated by a N×N Hermitian matrix Â. The binary representations of the eigenvalues of Â may be encoded in these states: $|\lambda_i\rangle = |b_1 b_2 \ldots b_n\rangle$; $\lambda_i$ is the i-th eigenvalue, excluding degeneracy, and $b_1 b_2 \ldots b_n$ is its binary representation. To perform the eigenvalue inversion, all of the possible n bit strings $b_1 b_2 \ldots b_n$ encoded in an n qubit ancillary register ($2^n$ values) are reviewed.

Figure 1:
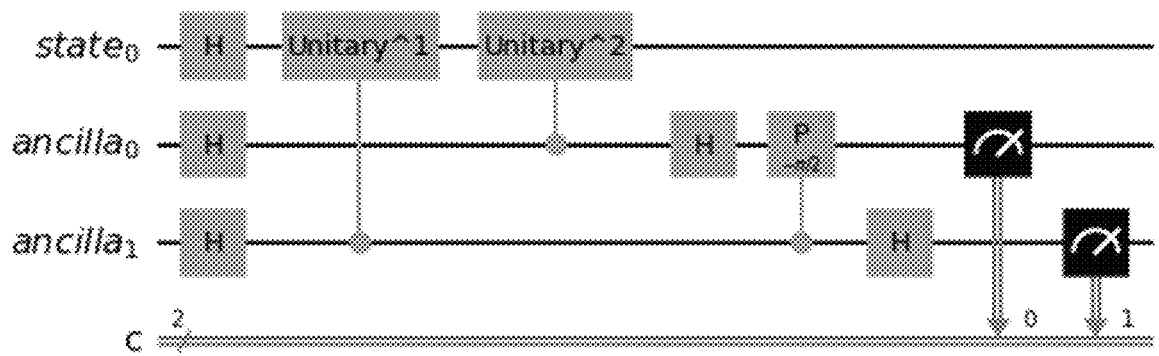
FIG. 1 depicts a standard QPEA circuit.

Referring to FIG. 1, a standard QPEA circuit is provided. The QPEA circuit in FIG. 1 uses a number of ancilla qubits equal to the desired precision of the eigenvalue estimations.

Figure 2:
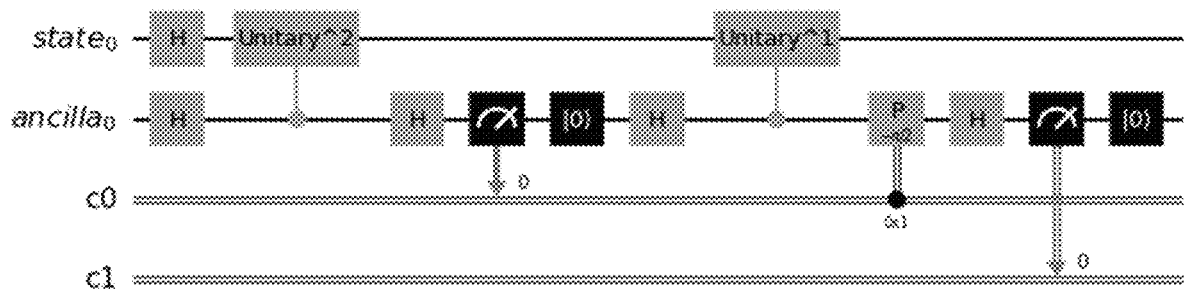
FIG. 2 depicts a circuit according to an embodiment.

Referring to FIG. 2, a circuit according to one embodiment is provided. The circuit of FIG. 1 uses only one ancilla by using quantum conditional logic that is conditioned on the classical result obtained from previously measuring the ancilla. The Phase gate (P(−π/2)) is conditioned by the information contained in the classical $C_0$ register. The ancilla is reset and reused n times whereas in the standard QPEA, n ancilla qubits are used. Moreover, the fact that the ancilla qubit is frequently measured and reset it requires smaller coherence time, therefore it is less exposed to noise than the standard. Last but not least, in the standard version we applied controlled gates between the n ancilla qubits whereas using conditional logic we apply gates conditioned on classical registers. The two qubit gates have a higher error rate than the gates conditioned on classical registers.

In embodiments, the subset of possible binary values is used to approximate the eigenvalues. For example, Table I, below, compares the number of ancillas used by QPEA and the rotations for eigenvalue inversion using different methods, such as a standard (e.g., FIG. 1) and a reduced QCL (e.g., FIG. 2) approach.

The standard approach is to review all of the possible n-bit strings $b_1 b_2 \ldots b_n$ encoded in an n qubit ancillary register ($2^n$ values). The reduced approach consists in reviewing the binaries that are the eigenvalues that are estimated before running QPEA (this is a subset of possible binary values). The reduced QCL is the same as the reduced approach but QPEA is run with conditional logic.

TABLE I

|  | Standard | Reduced | Reduced QCL |
|---|---|---|---|
| QPEA | — | n | 1 |
| Eigenvalue Inversion | N | n-k | n-k |

Both reduced approaches consist of using the information of the estimated eigenvalues obtained by QPEA to apply an efficient eigenvalue inversion. Without QCL, QPEA requires n ancilla qubits to measure the eigenvalues to n bits. With QCL, QPEA only requires one bit.

To estimate the eigenvalues to n bits, embodiments may reduce the number of ancilla qubits in the QPEA from n to 1. The same ancilla qubit is measured and reused; each measurement result is then used to perform quantum conditional logic. This conditionally performs operations before the next measurement of the ancilla is made. This results in fewer total qubits used and a smaller required coherence time for the ancilla qubit. This makes the circuits more resistant to the noise that characterizes the NISQ devices. Therefore, it is a more robust implementation of the eigenvalue inversion.

Figure 3:
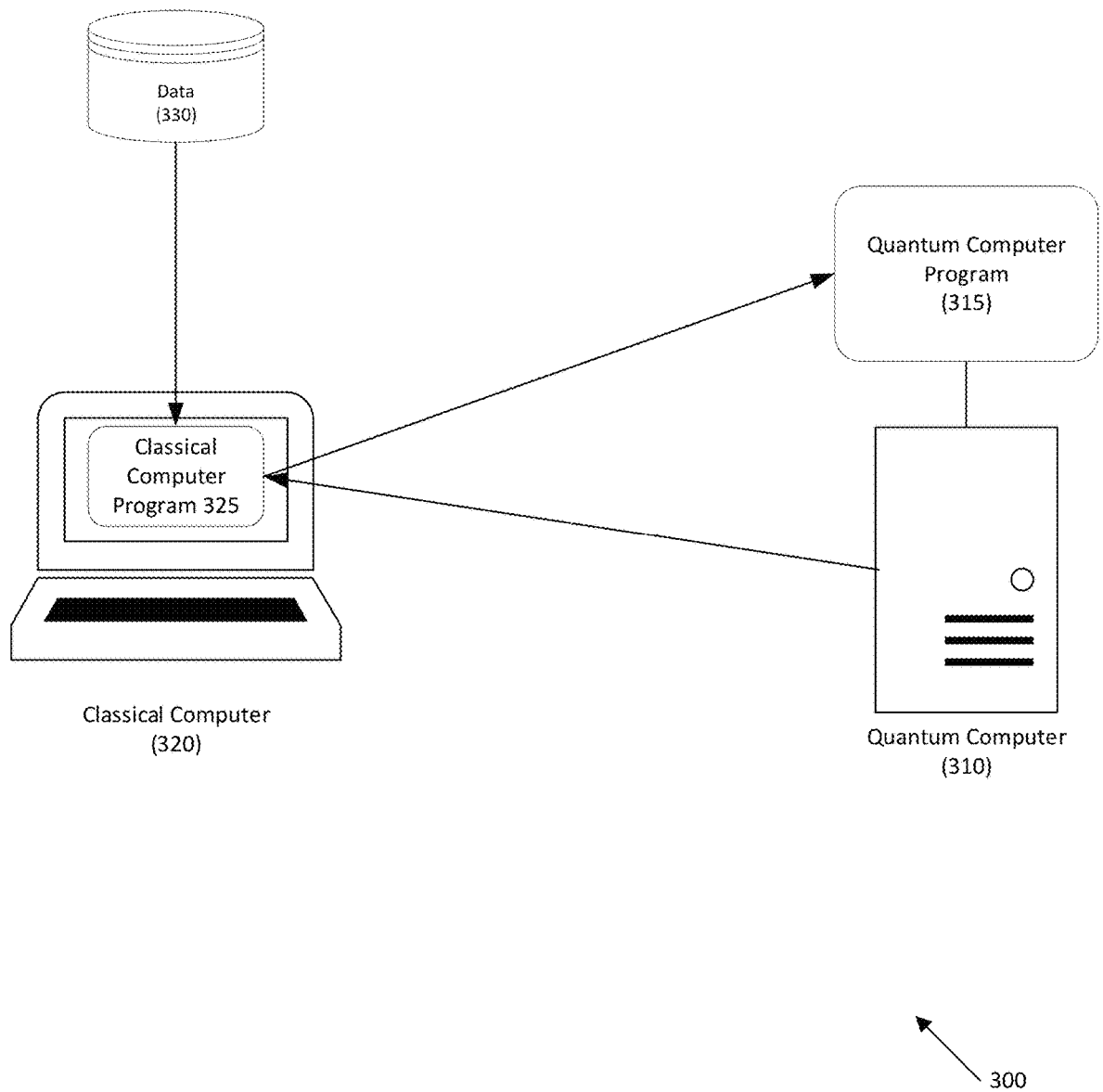
FIG. 3 depicts an exemplary system for enhanced eigenvalue inversion using quantum conditional logic according to an embodiment.

Referring to FIG. 3, a system for enhanced eigenvalue inversion using quantum conditional logic is disclosed according to an embodiment. System 300 may include quantum computer 310 that may execute quantum computer program 315. Classical computer 320 may interface with quantum computer program 315 using classical computer program 325. Classical computer 320 may be any suitable classical computing device, including servers, workstations, desktop, notebook, laptop, or tablet computers, etc.

Classical computer program 325 may provide input to, and receive output from, quantum computer 310 and/or quantum computer program 315. In one embodiment, classical computer program 325 may provide quantum computer program 315 to quantum computer 310. Classical computer program 325 may display the results of the execution of quantum computer program 315 on a display.

Database 330 may be a source of data that may be used to determine the eigenvalues. For example, the input data may be historical market data, production data, scheduling data, etc. Any suitable input data for which optimization may be desired may be used as is necessary and/or desired.

In one embodiment, classical computer program 325 may calculate eigenvalues for the data from database 330 and may provide the eigenvalues to quantum computer program 315 (e.g., an HHL circuit) to be executed by quantum computer 310 to solve quantum linear systems problems. Quantum computer 310 may then return results to classical computer program 325.

Figure 4:
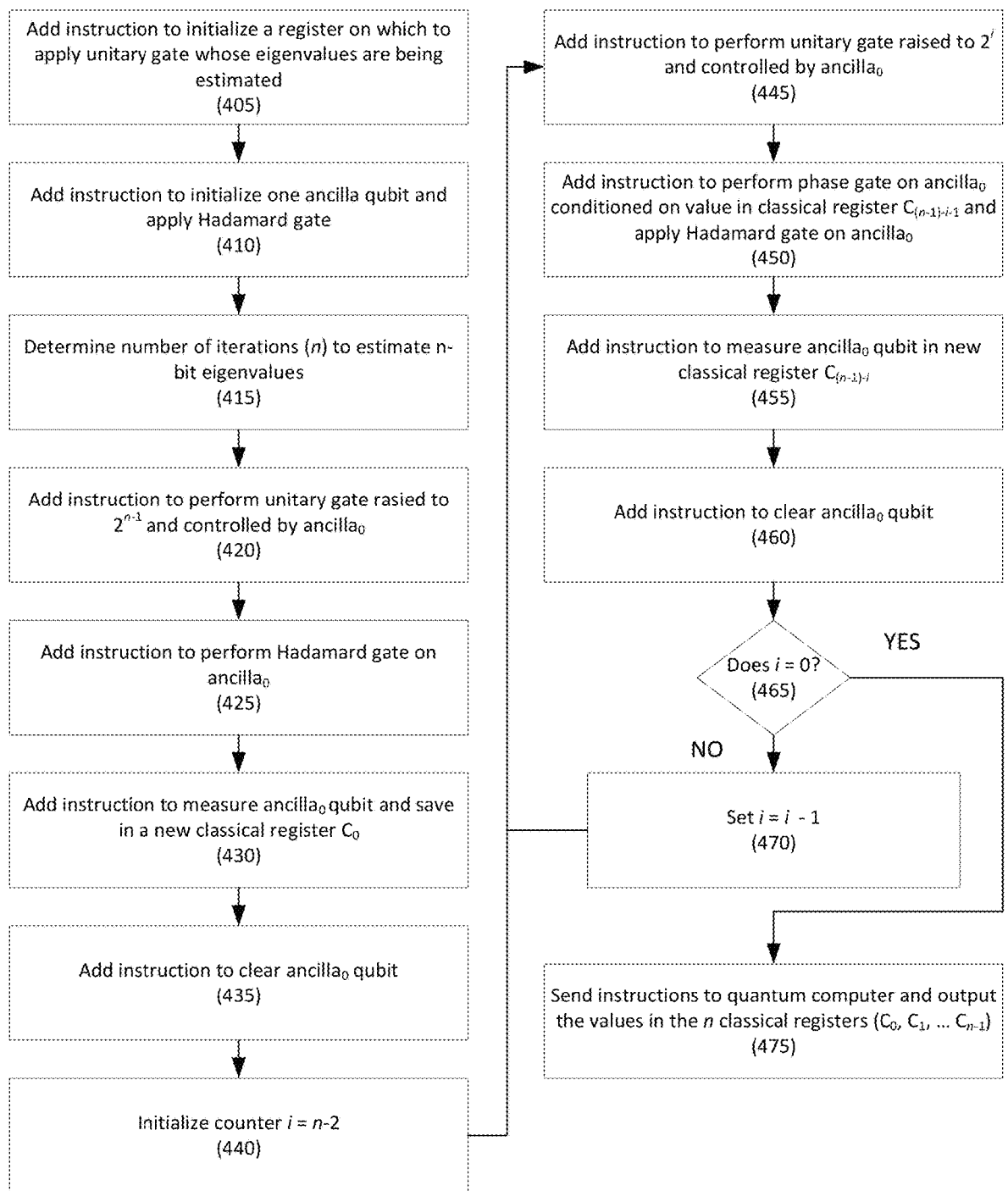
FIG. 4 depicts a method for executing QPEA using quantum conditional logic according to an embodiment.

Referring to FIG. 4, a method for executing QPEA using quantum conditional logic is disclosed according to an embodiment. In one embodiment, the method may be performed by a computer program executed by a computing device in conjunction with a quantum computer program executed by a quantum computer or quantum computer simulator.

In step 405, a classical computer program may add an instruction to initialize a register on which to apply unitary gate whose eigenvalues are being estimated.

In step 410, the classical computer program may add an instruction to initialize one ancilla qubit (e.g., ancilla$_0$) and to apply a Hadamard gate.

In step 415, the classical computer program may determine the number of iterations (n) to estimate n-bit eigenvalues may be determined. In one embodiment, the number of iterations is defined by the precision to achieve in eigenvalue estimation. In one embodiment, this value may be provided by the user based on the desired precision on the estimation of the binary eigenvalues.

In step 420, the classical computer program may add an instruction to perform a unitary gate raised to $2^{n-1}$ and controlled by the ancilla (e.g., ancilla$_0$).

In step 425, the classical computer program may add an instruction to perform a Hadamard gate on the ancilla.

In step 430, the classical computer program may add an instruction to measure the $ancilla_0$ qubit and save the measurement in a new classical register, $C_0$. In one embodiment, the measurement is a bit, 0 or 1.

In step 435, the classical computer program may add an instruction to clear the $ancilla_0$ qubit.

In step 440, the classical computer program may add an instruction to initialize a counter i to equal n−2.

In step 445, the classical computer program may add an instruction to perform a unitary gate raised to $2^i$ and controlled by the ancilla (e.g., $ancilla_0$).

In step 450, the classical computer program may add an instruction to perform a phase gate on the ancilla conditioned on the value in the classical register $C_{(n-1)-i-1}$.

In step 455, the classical computer program may add an instruction to measure the $ancilla_0$ qubit and save the measurement as a bit in a new classical register, $C_{(n-1)-i-1}$ and to apply a Hadamard gate on the ancilla (e.g., $ancilla_0$).

In step 460, the classical computer program may add an instruction to clear the ancilla (e.g., $ancilla_0$).

In step 465, if i is not equal to zero, in step 470, the classical computer program may add an instruction to set i to i−1 and may return to step 445. If i is zero, in step 475, the classical computer program may send instructions to quantum computer and output the values from the quantum computer the in the classical registers $C_0, C_1, \ldots C_{n-1}$. In one embodiment, the values in the classical registers ($C_0, C_1, \ldots C_{n-1}$) are the binaries. In one embodiment, the binaries may be plotted with probabilities. The circuit may be run a certain number of times (e.g., 1000 times) and the results from each run may be statistically analyzed to identify the binaries having the highest probabilities.

Embodiments may result in a more efficient circuit of the eigenvalue inversion as part of the HHL algorithm. Using QPEA to estimate the spectrum of a matrix is an algorithm on its own and this information is very useful for many applications. For example, the spectrum of A may be estimated so as to run a more efficient eigenvalue inversion circuit in the HHL algorithm since with the information of the spectrum we just look at a subset of the possible binary strings that approximate the eigenvalues (the ones that were estimated) instead of all the possible combinations.

Although several embodiments have been disclosed, it should be recognized that these embodiments are not exclusive to each other, and certain elements or features from one embodiment may be used with another.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

In one embodiment, the processing machine may be a classical computer, a quantum computer, etc.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, a memory stick, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A classical computer, comprising:
a computer processor; and
a memory storing a classical computer program;
wherein the classical computer program is configured to generate a quantum computer program comprising instructions to:
initialize a register to an initial state;
initialize an ancilla qubit and apply a Hadamard gate to the ancilla qubit;
determine a number of iterations n to estimate n-bit eigenvalues;

perform a first unitary gate raised to $2^{n-1}$ and controlled by the ancilla qubit;

perform a Hadamard gate on the ancilla qubit;

measure the ancilla qubit and save in a classical register $C_0$;

clear the ancilla qubit;

initialize a counter i to n−2;

perform a second unitary gate raised to $2^i$ and controlled by the ancilla qubit;

perform a phase gate on the ancilla qubit conditioned on a value in a classical register $C_{(n-1)-i-1}$ and apply a Hadamard gate on the ancilla qubit;

measure the ancilla qubit and save in a classical register $C_{(n-1)-i}$;

clear the ancilla qubit; and decrease i by 1 and repeating the performing of the second unitary gate, the performing of the phase gate, the applying of the Hadamard gate, the measuring of the ancilla qubit, the saving of the ancilla qubit, and the decreasing of i by 1 until i is equal to zero;

wherein the classical computer program sends the quantum computer program to a quantum computer, the quantum computer executes the quantum computer program, receives results from the quantum computer in the classical registers $C_0$, $C_1$, ... $C_{n-1}$, and outputs the results.

2. The classical computer of claim 1, wherein the results from the quantum computer in the classical registers $C_0$, $C_1$, ... $C_{n-1}$ are binaries of the n-bit eigenvalues.

3. A method for n-bit eigenvalue estimation, comprising:

receiving, by a quantum computer, a quantum computer program from a classical computer;

initializing, by the quantum computer program, a register on the quantum computer to an initial state;

initializing, by a quantum computer program, an ancilla qubit and apply a Hadamard gate to the ancilla qubit;

determining, by a quantum computer program, a number of iterations n to estimate n-bit eigenvalues;

performing, by a quantum computer program, a first unitary gate raised to $2^{n-1}$ and controlled by the ancilla qubit;

performing, by a quantum computer program, a Hadamard gate on the ancilla qubit;

measuring, by a quantum computer program, the ancilla qubit and save in a classical register $C_0$;

clearing, by a quantum computer program, the ancilla qubit;

initializing, by a quantum computer program, a counter i to n−2;

performing, by a quantum computer program, a second unitary gate raised to $2^i$ and controlled by the ancilla qubit;

performing, by a quantum computer program, a phase gate on the ancilla qubit conditioned on a value in a classical register $C_{(n-1)-i-1}$ and apply a Hadamard gate on the ancilla qubit;

measuring the ancilla qubit and save in a classical register $C_{(n-1)-i}$;

clearing the ancilla qubit;

decreasing i by 1 and repeating the performing of the second unitary gate, the performing of the phase gate, the applying of the Hadamard gate, the measuring of the ancilla qubit, the saving of the ancilla qubit, and the decreasing of i by 1 until i is equal to zero; and outputting the classical registers $C_0$, $C_1$, ... $C_{n-1}$ to the classical computer, wherein the classical registers $C_0$, $C_1$, ... $C_{n-1}$ comprise the n-bit eigenvalues.

4. A system, comprising:

a classical computer comprising a memory storing a classical computer program, wherein the classical computer program is configured to generate a quantum computer program comprising instructions to:

initialize a register in the quantum computer to an initial state;

initialize an ancilla qubit and apply a Hadamard gate to the ancilla qubit;

determine a number of iterations n to estimate n-bit eigenvalues;

perform a first unitary gate raised to $2^{n-1}$ and controlled by the ancilla qubit;

perform a Hadamard gate on the ancilla qubit;

measure the ancilla qubit and save in a classical register $C_0$;

clear the ancilla qubit;

initialize a counter i to n−2;

perform a second unitary gate raised to $2^i$ and controlled by the ancilla qubit;

perform a phase gate on the ancilla qubit conditioned on a value in a classical register $C_{(n-1)-i-1}$ and apply a Hadamard gate on the ancilla qubit;

measure the ancilla qubit and save in a classical register $C_{(n-1)-i}$;

clear the ancilla qubit; and decrease i by 1 and repeating the performing of the second unitary gate, the performing of the phase gate, the applying of the Hadamard gate, the measuring of the ancilla qubit, the saving of the ancilla qubit, and the decreasing of i by 1 until i is equal to zero;

a quantum computer that is configured to receive the quantum computer program from the classical computer, to execute the quantum computer program, and to output the classical registers $C_0$, $C_1$, ... $C_{n-1}$ to the classical computer program, wherein the classical registers $C_0$, $C_1$, ... $C_{n-1}$ comprise the n-bit eigenvalues.

* * * * *